United States Patent
Beymore (10) Patent No.: US 10,586,162 B2
(45) Date of Patent: Mar. 10, 2020

(54) SYSTEMS AND METHODS FOR DETERMINING A COATING FORMULATION

(71) Applicant: PPG Industries Ohio, Inc., Cleveland, OH (US)

(72) Inventor: Paul M. Beymore, Vermilion, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 646 days.

(21) Appl. No.: 13/832,554

(22) Filed: Mar. 15, 2013

(65) Prior Publication Data

US 2014/0278253 A1    Sep. 18, 2014

(51) Int. Cl.
*G06N 7/00*    (2006.01)

(52) U.S. Cl.
CPC .................. *G06N 7/005* (2013.01)

(58) Field of Classification Search
CPC ..................................... G06N 7/005
See application file for complete search history.

(56) References Cited

U.S. PATENT DOCUMENTS

| 3,927,944 | A | * | 12/1975 | Iwahashi | G01J 3/427 356/320 |
| 3,972,617 | A | * | 8/1976 | Shibata | G01J 3/42 356/319 |
| 4,092,069 | A | * | 5/1978 | Fukuda | G01N 21/27 250/214 AG |
| 4,164,374 | A | * | 8/1979 | Lambe | G01J 3/10 250/226 |
| 4,344,142 | A | * | 8/1982 | Diehr, II | B29C 35/0288 264/325 |
| 4,479,718 | A | | 10/1984 | Alman | |
| 4,544,424 | A | | 10/1985 | Take | |
| 4,711,580 | A | | 12/1987 | Venable | |
| 5,231,472 | A | | 7/1993 | Marcus | |
| 5,319,437 | A | | 6/1994 | Van Aken | |
| 5,590,251 | A | * | 12/1996 | Takagi | G01J 3/462 345/604 |
| 5,612,928 | A | | 3/1997 | Haley | |

(Continued)

FOREIGN PATENT DOCUMENTS

| CN | 1635957 | 7/2005 |
| CN | 1797420 | 7/2006 |

(Continued)

OTHER PUBLICATIONS

*Alice* vs *CLS Bank* (Supreme Court Decision) (2013).*

(Continued)

*Primary Examiner* — Hyun D Park
(74) *Attorney, Agent, or Firm* — Workman Nydegger (57) ABSTRACT

A computer implemented method. The method includes identifying, using a processor, a bulk pigment in a target coating, wherein identifying comprises applying a Bayesian process, and identifying, using the processor, at least one refined pigment in the target coating, wherein identifying comprises applying a Bayesian process. The method also includes formulating, using a processor, a formulation of the target coating, wherein formulating comprises applying a Bayesian process, and outputting the formulation.

17 Claims, 8 Drawing Sheets

(56) References Cited

U.S. PATENT DOCUMENTS

| | | | |
|---|---|---|---|
| 5,926,262 A * | 7/1999 | Jung | A61B 5/0088 356/416 |
| 6,056,821 A | 5/2000 | Nihongi | |
| 6,166,841 A | 12/2000 | Pringle | |
| 6,249,751 B1 | 6/2001 | Asaba et al. | |
| 6,449,384 B2 | 9/2002 | Di Venuto | |
| 6,539,325 B1 | 3/2003 | Numata | |
| 6,794,669 B2 | 9/2004 | Chelvayohan et al. | |
| 7,809,155 B2 | 10/2010 | Nestares | |
| 7,944,561 B2 | 5/2011 | Nisper et al. | |
| 8,345,252 B2 | 1/2013 | Nisper et al. | |
| 8,606,731 B2 | 12/2013 | Fujieda et al. | |
| 8,879,066 B2 | 11/2014 | Norris | |
| 9,482,657 B2 | 11/2016 | Bell | |
| 2003/0208345 A1 | 11/2003 | O'Neill | |
| 2004/0218182 A1* | 11/2004 | Alman | G01J 3/46 356/402 |
| 2005/0128484 A1 | 6/2005 | Rodrigues | |
| 2005/0169518 A1 | 8/2005 | Boston et al. | |
| 2005/0206383 A1 | 9/2005 | Park | |
| 2006/0030060 A1 | 2/2006 | Noguchi et al. | |
| 2006/0045831 A1 | 3/2006 | Galembeck | |
| 2006/0245632 A1 | 11/2006 | Nisper et al. | |
| 2007/0019887 A1 | 1/2007 | Nestares | |
| 2007/0172113 A1 | 7/2007 | Sai et al. | |
| 2007/0200337 A1 | 8/2007 | Johnson et al. | |
| 2007/0226158 A1 | 9/2007 | Woronow | |
| 2007/0250273 A1 | 10/2007 | De Haas | |
| 2008/0177586 A1 | 7/2008 | Jamjoom | |
| 2008/0278723 A1 | 11/2008 | Merchak | |
| 2009/0015835 A1 | 1/2009 | Balakrishnen et al. | |
| 2009/0157212 A1 | 6/2009 | McClanahan | |
| 2009/0190839 A1 | 7/2009 | Higgins | |
| 2009/0213120 A1 | 8/2009 | Nisper et al. | |
| 2009/0292520 A1 | 11/2009 | Nwankpa | |
| 2010/0048242 A1 | 2/2010 | Rhoads | |
| 2010/0228511 A1 | 9/2010 | Chin et al. | |
| 2011/0282613 A1 | 11/2011 | Skinner | |
| 2012/0225190 A1* | 9/2012 | Steenhoek | G01N 21/25 427/8 |
| 2012/0243797 A1 | 9/2012 | Di Venuto | |
| 2012/0303376 A1 | 11/2012 | Shishido | |
| 2013/0244197 A1 | 9/2013 | Tijoe | |
| 2014/0118936 A1 | 5/2014 | Merlet et al. | |
| 2014/0242271 A1 | 8/2014 | Prakash et al. | |
| 2014/0250109 A1 | 9/2014 | Wang | |
| 2014/0278253 A1 | 9/2014 | Beymore | |
| 2014/0278254 A1 | 9/2014 | Beymore | |
| 2015/0023054 A1 | 1/2015 | Goda | |
| 2015/0134269 A1 | 5/2015 | Norris | |
| 2015/0134299 A1 | 5/2015 | Norris | |
| 2015/0134300 A1 | 5/2015 | Norris | |

FOREIGN PATENT DOCUMENTS

| | | |
|---|---|---|
| CN | 101184986 | 5/2008 |
| CN | 101646929 | 2/2010 |
| CN | 101784871 | 7/2010 |
| CN | 102549545 | 7/2012 |
| JP | 07150081 | 6/1995 |
| JP | 2002236850 | 8/2002 |
| JP | 2006277555 | 10/2006 |
| JP | 2007/218895 | 8/2007 |
| JP | 2007218895 | 8/2007 |
| JP | 2006053070 | 7/2008 |
| JP | 2010242018 | 10/2010 |
| KR | 20100102147 | 9/2010 |
| TW | 200608310 | 3/2006 |
| TW | 200821602 A | 5/2008 |
| TW | I298466 | 7/2008 |
| TW | 200834273 A | 8/2008 |
| TW | 201339652 | 10/2013 |
| WO | 2003063719 | 8/2003 |
| WO | 2006096521 | 9/2006 |
| WO | 2006112864 | 10/2006 |
| WO | 2007096402 | 1/2009 |
| WO | 2013049792 | 4/2013 |
| WO | 2013116192 | 8/2013 |
| WO | WO 2014/150337 A2 | 9/2014 |

OTHER PUBLICATIONS

Massonnet et al., Identification of organic pigments in coatings: applications to red automotive topcoats, First meeting of the European Academy of Forensic sciences, 1997.*

Harkins et al., Identification of pigments in paint products by infrared spectroscopy, Analytical Chemistry, 1959.*

Janina et al., Examination of multilayer paint coats by the use of infrared, Raman and XRF spectroscopy for forensic purposes, J. of Molecular Structure, 2006.*

"Rafik," Bulk optical properties of phthalocyanine pigment particles, Can J. Chem, 1980.*

I. Lissner, U. Philipp: "Upgrading Color-Difference Formulas", Journal of the Optical Society of America, vol. 27 No, 7, Jun. 11, 2010 (Jun. 11, 2010), pp. 1620-1629, XP055152562, DOI: 10.1364/JOSAA.27.001620 Sections 1 and 2.A.

D. Puig, M.A. Garcia, J. Melendez: "Application-independent feature selection for texture classification", Pattern Recognition, vol. 43, No. 10, May 10, 2010 (May 10, 2010), pp. 3182-3297, XP027095420, DOI: 10.1016/j. patcog.2010.05.005 abstract and section 3.

J.H. Xin, S. Shao, K.F.-L. Chung: "Colour-appearance modeling using feedforward networks with Bayesian regularization method-part 1: forward model", Color Research & Application, vol. 25, No. 6, Oct. 13, 2000, pp. 424-434, XP055152560, DOI: 10.1002/1520-6378(200012)25:6<424:"AID-COL7>3.0.CO;2-Q.

E. Kirchner: "Appearance and measurement modeling and rendering of the visual texture of automotive paints", Detroit Color Council, Mar. 13, 2013, XP055153198, Retrieved from the Internet: URL:http://www.detroitcc.org/files/2013March14b.pdf, [retrieved on Apr. 3, 2013] Models for predicting Texture.

E.J.J. Kirchner, J. Ravi: "Setting tolerances on color and texture for automotive coatings", Color Research & Application, vol. 39, No. 1, Jul. 25, 2012 pp. 88-98, XP055152561, DOI: 10.1002/col. 21767.

PPG Automotive Refinish: "RapidMatch(TM) X-5: guide utente", Pittsburgh Plate Glass (PPG) Industries, 2013, XP055153237, retrieved from the Internet: URL:http://it.nexaautocolor.com/media/213903/rapidmatch_v1-2012_email_version.pdf [retrieved on Sep. 22, 2014].

Kokla, Vassiliki et al., A Bayesian decision model for watercolour analysis, Proc. of SPIE, 2007, vol. 6618, pp. 66180S-1-66180S-9.

Korean Office Action for application No. 2015/7025129 dated Dec. 29, 2016.

Chinese Office Action for application No. 201480015524.6 dated Dec. 26, 2016.

Kuncheva, Ludmila I., James C. Bezdek, and Robert PW Duin. "Decision templates for multiple classifier fusion: an experimental comparison." Pattern recognition 34.2. 2001.

Korean Office Action in application No. 201507025129 dated Jun. 21, 2016.

Anonymous, "Chapter 1.3.5.17. Detection of Outliers", NIST/SEMATECH e-Handbook of Statistical Methods, Jan. 1, 2012, XP055162021.

Paravina et al, "Evaluation of blending effect of composites related to restoration size", Dental Materials, Elsevier, Amsterdam, NL, vol. 22, No. 4, Apr. 1, 2006, pp. 299-307, XP027943381, ISSN: 0109-5641 table 2.

Takagi et al, "Prediction of spectral reflectance factor distribution of color-shift paint finishes", Color Research & Application, John Wiley & Sons, Inc., US, vol. 32, No. 5, Oct. 1, 2007, pp. 378-387, XP002604927, ISSN: 0361-2317.

Beymore, Paul M., U.S. Appl. No. 14/121,869, "Pigment Identification of Complex Coating Mixtures with Sparkle Color", filed Oct. 28, 2014.

Non-Final Office Action for U.S. Appl. No. 14/535,399 dated Apr. 4, 2017.

(56) References Cited

OTHER PUBLICATIONS

Final Office Action for U.S. Appl. No. 14/535,399 dated Nov. 1, 2017.
Non-Final Office Action in U.S. Appl. No. 14/535,380 dated Apr. 12, 2017.
Office Action in application No. 201480070100.X dated Feb. 27, 2017.
Final Office Action for U.S. Appl. No. 14/535,380 dated Oct. 27, 2017.
Final Office Action for U.S. Appl. No. 14/535,372 dated Oct. 6, 2017.
Non-Final Office Action for U.S. Appl. No. 14/535,372 dated Jun. 20, 2017.
Non-Final Office Action for U.S. Appl. No. 13/832,116 dated Mar. 5, 2014.
Notice of Allowance from U.S. Appl. No. 13/835,675 dated Nov. 1, 2016.
Non-Final Office Action from U.S. Appl. No. 13/835,675 dated Sep. 16, 2015.
Taiwan Office Action for application No. 103109480 dated Sep. 17, 2015.
Korean Office Action in application No. 2015-7025121 dated Jul. 25, 2016.
International Search Report for application No. PCT/US2014/022983 dated Nov. 28, 2014.
Korean Office Action in application No. 2015-7025121 dated Jan. 31, 2017.
Chinese Office Action in application No. 201480015523.1 dated Feb. 7, 2017.
Non-Final Office Action in U.S. Appl. No. 13/835,675 dated May 2, 2017.
Final Office Action for U.S. Appl. No. 13/835,675 dated Dec. 12, 2017.
Non-Final Office Action for U.S. Appl. No. 14/535,372 dated Feb. 15, 2018.
Li Sun and Richard M. Crooks in Molecular Interactions between Organized, Surface Confided Monolayers and Vapor-Phase Probe Molecules. 5. Acid-Base Interactions, 1993 American Chemical Society, pp. 1775-1780.
Wang Qiang, "Texture Analysis and Classification Based on Bayesian Network Model", Computer Aided Design & Computer Graphics, Dec. 31, 2007, pp. 1565-1568.
Takuro Yonezawa, "An Event Description Language Using Temporal Relation for Smart Object Services", IPSJ SIG Technical Report 2008-MBL-44, Mobile computing and ubiquitous communication, 2008-UBI-17, Ubiquitous computing system, Information Processing Society of Japan, Feb. 27, 2008, vol. 2008, No. 18, pp. 75-82.
Japanese Office Action for application No. JP2016-501119 dated Nov. 7, 2016.
Non-Final Office Action for U.S. Appl. No. 14/535,372 dated Apr. 26, 2018.
Notice of Grant dated Nov. 3, 2017 from Chinese Patent Application No. 201480015524 filed Mar. 10, 2014.
International Search Report dated Dec. 4, 2014 from International Patent Application No. PCT/US2014/022369 filed Mar. 10, 2014.
International Preliminary Report on Patentability dated Sep. 15, 2015 from International Patent Application No. PCT/US2014/022369 filed Mar. 10, 2014.
Office action dated Feb. 28, 2017 from Korean Patent Application No. 20157025129 filed Mar. 10, 2014.
Exam Report dated Apr. 10, 2019 from European Patent Application No. 14717546 filed Mar. 10, 2014.
Office Action dated Oct. 14, 2016 from Japanese Patent Application No. 2016500952 filed Mar. 10, 2014.
Office Action dated Jun. 16, 2017 from Japanese Patent Application No. 2016500952 filed Mar. 10, 2014.
Decision to Grant dated Feb. 2, 2018 from Japanese Patent Application No. 2016500952 filed Mar. 10, 2014.
Office Action dated Dec. 15, 2016 from Canadian Patent Application No. 2903458 filed Mar. 10, 2014.
Office Action dated Feb. 4, 2016 from U.S. Appl. No. 13/835,675, filed Mar. 15, 2013.
Notice of Allowance dated Apr. 13, 2018 from U.S. Appl. No. 13/835,675, filed Mar. 15, 2013.
Notice of Allowance dated Aug. 7, 2018 from U.S. Appl. No. 13/835,675, filed Mar. 15, 2013.
Issue Notification dated Nov. 14, 2018 from U.S. Appl. No. 13/835,675, filed Mar. 15, 2013.
Office Action dated Jul. 17, 2016 from Taiwan Patent Application No. 103109480 filed Mar. 11, 2014.
International Report on Patentability dated Sep. 15, 2015 from International Patent Application No. PCT/US2014/022983 filed Mar. 11, 2014.
Office Action dated Aug. 11, 2017 from Chinese Patent Application No. 201480015523.1 filed Mar. 11, 2014.
Notification of Grant dated Dec. 14, 2017 from Chinese Patent Application No. 201480015523.1 filed Mar. 11, 2014.
Decision to Grant dated May 16, 2017 from Japanese Patent Application No. 2016-50119 filed Mar. 11, 2014.
Office action dated Dec. 9, 2016 from Canadian Patent Application No. 2903466 filed Mar. 11, 2014.
Niedzinski, Cezary et al. and Bayesian Approach to Spectrophotometric Analysis of Multicomponent Substances and IEEE Transactions on Instrumentation and Measurement, Jun. 2000, vol. 49, No. 3, pp. 637-642.

* cited by examiner

FIG. 1
*PRIOR ART*

GIVEN THAT THE SAMPLE HAS BULK PIGMENT TYPE(S), WHICH SPECIFIC PIGMENTS BEST MATCH THOSE WITHIN THE SAMPLE

A SIMPLE
CIRCULAR SYSTEM

A MORE COMPLICATED BRANCHING SYSTEM
WITH "GRANDPARENT" DECISIONS

A MORE COMPLICATED
CIRCULAR SYSTEM

SYSTEMS AND METHODS FOR DETERMINING A COATING FORMULATION

FIELD OF THE INVENTION

In various embodiments, the present invention generally relates to systems and methods for evaluating colorimetric and physical property attributes of coating mixtures in order to provide a toner list and a matching coating formulation to a user.

BACKGROUND OF THE INVENTION

In order to provide a proper color match to a target sample that is coated with a target coating using formulation or search engines (or a visual process), it is desirable to determine the correct pigmentation of the target coating. If the same pigments or appropriate offsets as those in the target coating are utilized, a formulation or search process may arrive at an apparent optimum solution as to the formulation of the target coating. On the other hand, excluding those pigments, either deliberately or inadvertently, from availability will result in a less than optimal color match.

Several existing formulation engines and methodologies attempt to encompass pigment selection and formulation via various algorithms. Various pigment identification packages and formulation engines take a "brute" force, guess and check type of approach to provide formulations and pigment information to their users. The combinatorial approach, or brute force method, is a frequently used method in which nearly all available pigments are combined in all combinations available given an end number of pigments desired in the final match. The combinatorial approach may utilize the Kubelka-Munk equation or a derivative thereof to generate the various formulations. Although there have been some methods which restrict the usage of some pigments given certain conditions to optimize the engine's speed, the end result is that the formula combinations are validated against the sample and a selection of one or more formulas most nearly matching the target coating are provided to the user. There are various forms of Delta E's or other colorimetric assessment algorithms that are used to determine the accuracy of the match compared to the sample.

Other solutions require the user to submit a sample set of toners to a formulation engine, and still other methods select a predefined subset of toners to use. Neither of these approaches utilizes a stepwise method and thus often results in non-optimal solutions. These methods have been typically burdensome for users and lack proper "intuition" to provide a streamlined method to a good solution for the user. Additionally, by the nature of such methodology, appropriate pigments necessary to match the target coating may be excluded.

Neural networks have been used to select color matches from existing databases of pre-generated possible matches or to act as formulation engines themselves. The strength of a neural network is its ability to address both linear and non-linear relationships, but this strength comes at a cost of bulkiness, inflexibility, and a requirement of significant overhead to meticulously manage a sometimes large learning database and structure. The inflexibility, or rigid operation, of a neural network generally must be used in a feedback design to optimize the node weightings leading to and within the hidden layers of the network. A neural network requires this type of backpropagation of errors acquired from desired outputs in order to "learn." The actual learning, or training, of the neural network is based on the reduction of the calculated error given a desired output by repeated reintroduction of the input and adjustment of the weights based on the prior iteration's error.

Figure 1:
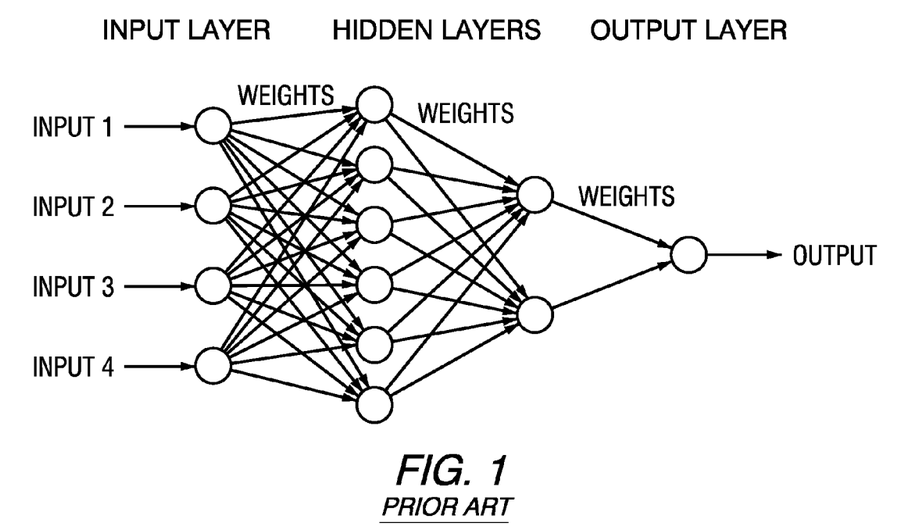
FIG. 1 illustrates a typical neural network.

As can be seen in FIG. 1, a typical neural network requires a nearly ideally defined input and requires significant effort to update and/or alter the various layers (nodes) if an error needs to be corrected or a new piece of information needs to be considered. Although fewer steps, compared to some prior models, are apparent to the user, a neural network tends to be relatively slow and unidirectional due to its nature of trying to encompass the resolution to a formulation or color search in one massive step. Also, as with the methodologies discussed hereinabove, the exclusion of necessary pigments is a possibility. A neural network also requires precise and somewhat tedious maintenance of the weights, the database, the calculations, the sophisticated and rigid process mapping, and the substantial "training" to be effective.

Thus, there is a need for systems and methods that have flexibility to partition the processing steps into smaller multidirectional pieces and that utilize a feed forward type of design for speed and accuracy. There is also a need for systems and methods that minimize user interaction and create a flexible stepwise methodology of pigment identification and tolerancing in combination with a formulation engine.

SUMMARY OF THE INVENTION

In a first aspect, embodiments of the invention provide a computer implemented method. The method includes identifying, using a processor, a bulk pigment in a target coating, wherein identifying comprises applying a Bayesian process, and identifying, using the processor, at least one refined pigment in the target coating, wherein identifying comprises applying a Bayesian process. The method also includes formulating, using a processor, a formulation of the target coating, wherein formulating comprises applying a Bayesian process, and outputting the formulation.

In another aspect, embodiments of the invention are directed to a system. The system includes a database and a processor in communication with the database. The processor is programmed to identify a bulk pigment in a target coating, wherein identifying comprises applying a Bayesian process, and identify at least one refined pigment in the target coating, wherein identifying comprises applying a Bayesian process. The processor is also programmed to formulate a formulation of the target coating, wherein formulating comprises applying a Bayesian process, and output the formulation.

In another aspect, embodiments of the invention provide an apparatus. The apparatus includes means for identifying a bulk pigment in a target coating, wherein identifying comprises applying a Bayesian process, and means for identifying at least one refined pigment in the target coating, wherein identifying comprises applying a Bayesian process. The apparatus also includes means for formulating a formulation of the target coating, wherein formulating comprises applying a Bayesian process, and means for outputting the formulation.

In a further aspect, embodiments of the invention provide a non-transitory computer readable medium including software for causing a processor to:

identify a bulk pigment in a target coating, wherein identifying comprises applying a Bayesian process;

identify at least one refined pigment in the target coating, wherein identifying comprises applying a Bayesian process;

formulate a formulation of the target coating, wherein formulating comprises applying a Bayesian process; and output the formulation.

DETAILED DESCRIPTION OF THE INVENTION

Figure 2:
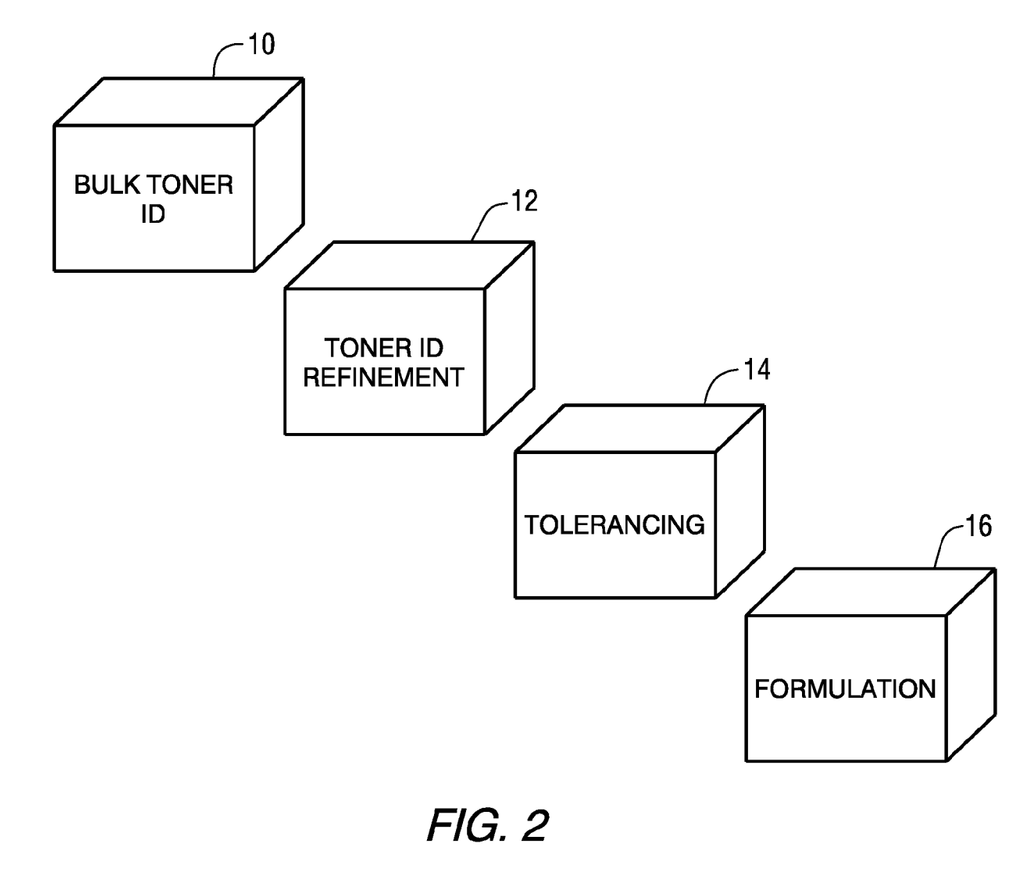
FIGS. 2 and 3 illustrate high level representations of four tiers, or modules, of a system according to various embodiments of the present invention.

In various embodiments, the present invention generally relates to systems and methods comprising a Bayesian belief system that may include, for example, four tiers, or modules, that may be independent or dependent Bayesian systems and methods. As illustrated in FIG. 2, the tiers may include a bulk pigment identification module 10, a refined pigment identification module 12, a tolerancing module 14, and a formulation module 16. The modules may be used in combination to identify pigment types, specific pigments, and to formulate recipes for samples that are coated with an unknown target coating. In another aspect, the modules 10, 12, 14 and 16 may be used separately to identify pigment types or specific pigments to assist with a visual or computerized searching process in order to find a matching formula from a database.

Figure 3:
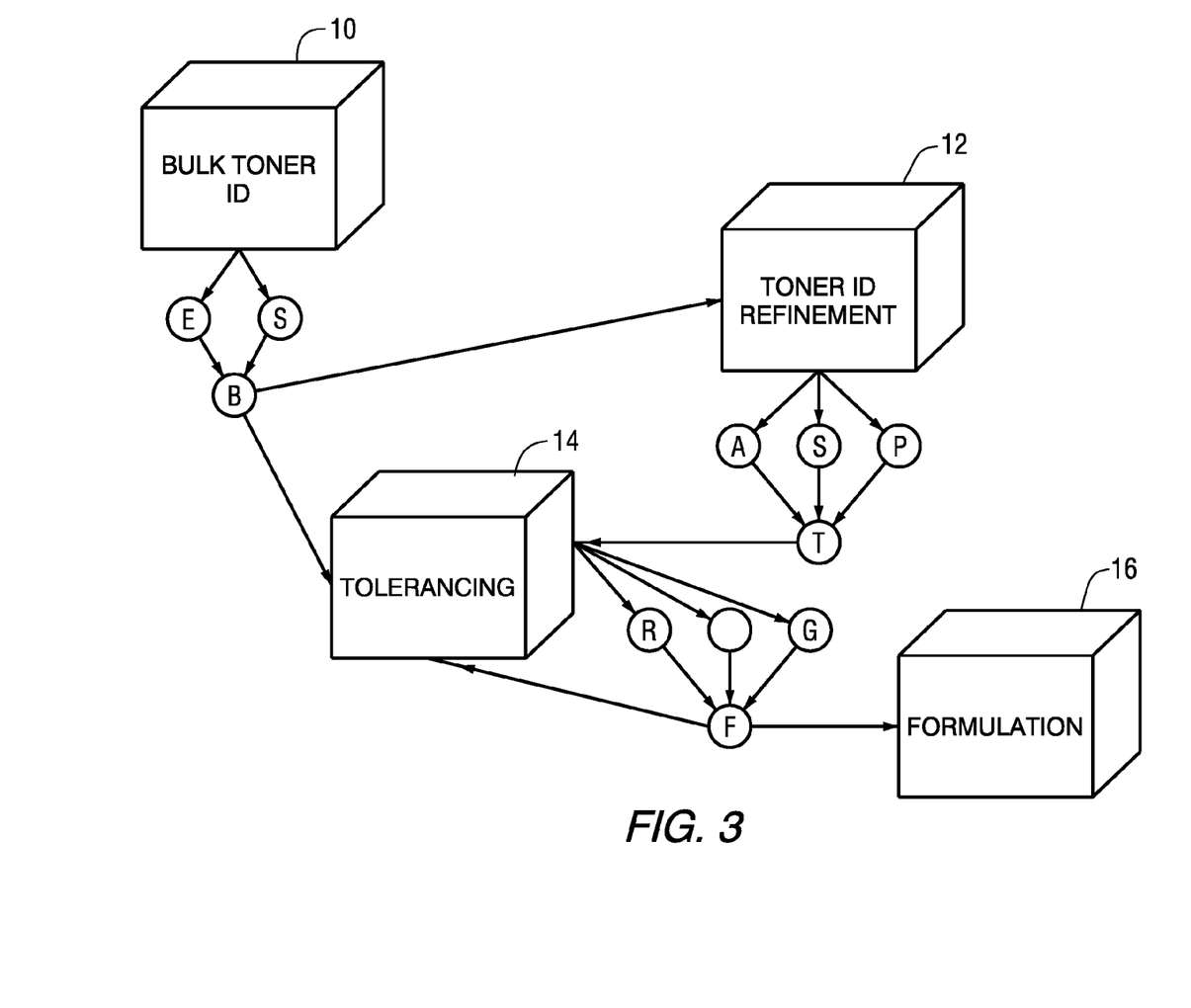

As illustrated in FIG. 2, the modules 10, 12, 14 and 16 may be separated and not fully connected at a high level. FIG. 3 illustrates the manner in which the modules 10, 12, 14 and 16 may communicate as Bayesian systems.

While the description herein generally refers to paint, it should be understood that the devices, systems and methods apply to other types of coatings, including stain and industrial coatings. The described embodiments of the invention should not be considered as limiting. A method consistent with the present invention may be practiced in a variety of fields such as the matching and/or coordination of apparel and fashion products.

Embodiments of the invention may be used with or incorporated in a computer system that may be a standalone unit or include one or more remote terminals or devices in communication with a central computer via a network such as, for example, the Internet or an intranet. As such, the computer or "processor" and related components described herein may be a portion of a local computer system or a remote computer or an on-line system or combinations thereof. The database and software described herein may be stored in computer internal memory or in a non-transitory computer readable medium.

Figure 4:
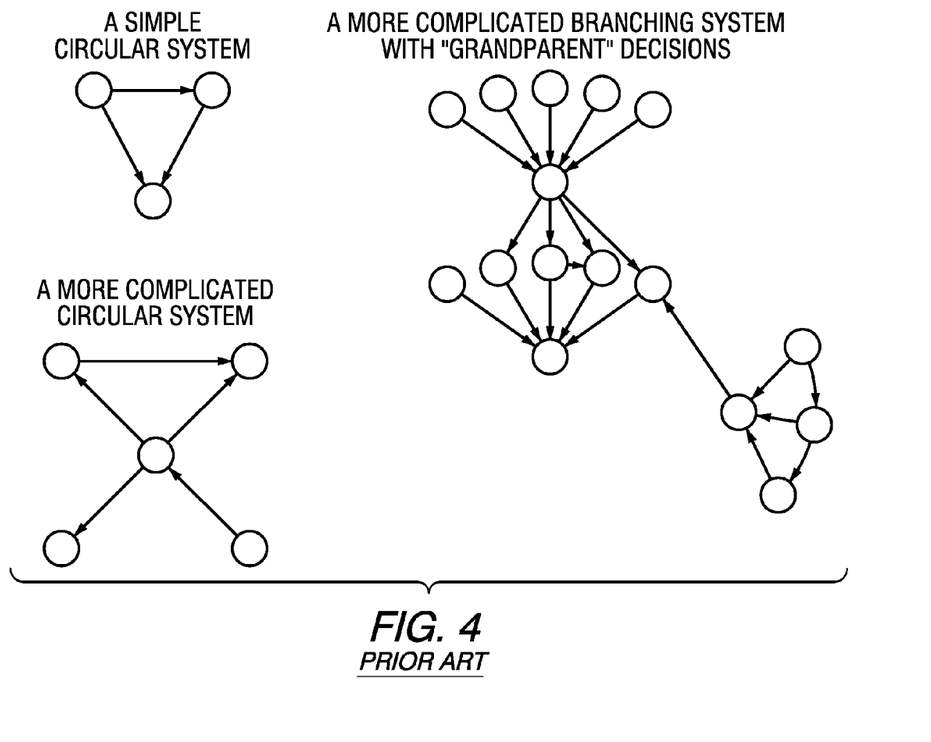
FIG. 4 illustrates examples of typical Bayesian systems.

A Bayesian system is based on probabilistic reasoning from Bayes' Theorem, which is derived from the conditional probability's definition. Examples of Bayesian systems are shown in FIG. 4.

Bayes Theorem     Equation 1

$$P(A \mid B) = \frac{P(B \mid A) P(A)}{P(B)}$$

where: $P(B) \neq 0$

In order to simplify the pigment identification of a target coating, a general sorting process may be used to place the sample into one or more bulk pigment types. By utilizing Bayes theorem a system of dependent and independent decision points may be designed to determine the pigment type, or bulk pigment, in an unknown sample. A bulk pigment may be defined based on characteristics of a class of pigments such as, but not limited to, the following: solids, effects, and aluminums. Given the flexibility of a Bayesian system it is possible to further subdivide the bulk toner classifications such as to indicate a difference between silver aluminums and colored aluminums.

Figure 5:
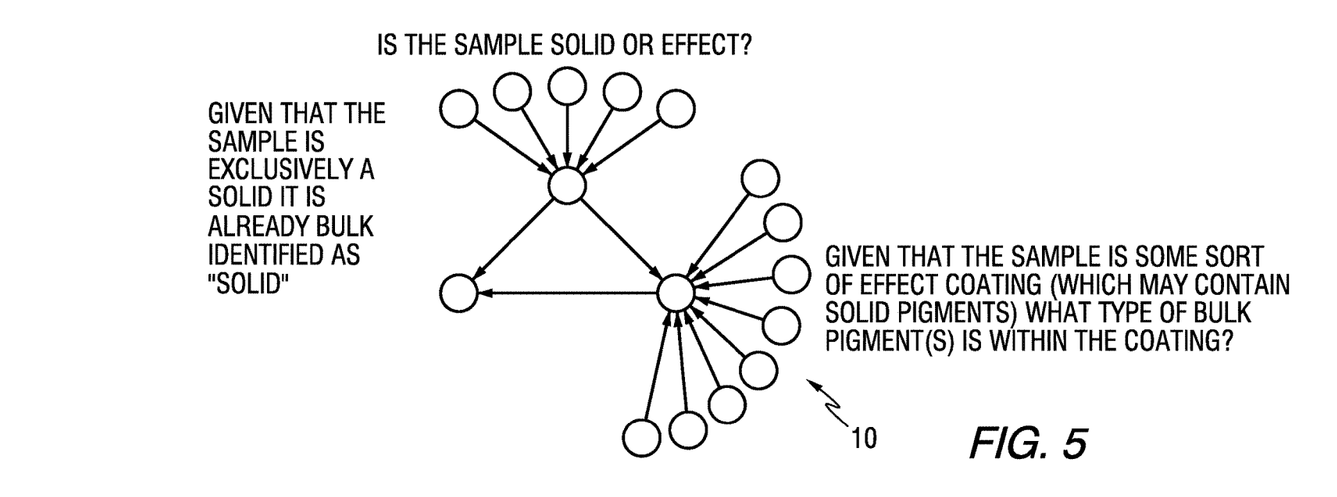
FIG. 5 illustrates a high level representation of a bulk pigment identification Bayesian module according to various embodiments of the present invention.

A basic Bayesian system consisting of multiple decision points may be used to determine the probability (belief) that a given sample contains only one pigment type, all bulk pigment types, or a lesser combination thereof. The various decision points may consist of, but not limited to, the following: specific angular analysis for a bulk pigment type (i.e. looking for key characteristics demonstrated by pigments within a selection of angular spectral data), usage of a similarity index on spectral data or colorimetric information, three dimensional (3D) and two dimensional (2D) geometric evaluation of pigment properties, a hybridized electrostatic analysis of pigment properties, evaluation of a normalized multiangular set of spectral and colorimetric data, texture information analysis (possibly image analysis via a principle component methodology), evaluation of specular information, or even an application of physics trajectories in conjunction with 2D planes created by manipulation of spectral and colorimetric information. An example of the bulk pigment identification Bayesian module 10 is shown in FIG. 5. The decision points may be crafted so as to refer to reference characteristics for each bulk pigment type in order to determine the appropriate bulk pigment(s) in the target coating. Each of the decision points may be equally or divisionally weighted by fixed predetermined values with regard to their unique probabilities of successfully determining a bulk pigment type. The probability may be further refined given the type of bulk pigment identified by the decision. In various embodiments, it can be first determined whether a given target coating is a straight shade or some other type of bulk pigmentation. The decision points may then be used, or re-used, all or in part to further define the bulk pigment via re-use of the decision points or by utilizing inherited decisions from prior points. The output of the first module 10 is the determination of the bulk pigment(s) of the target coating.

Figure 6:
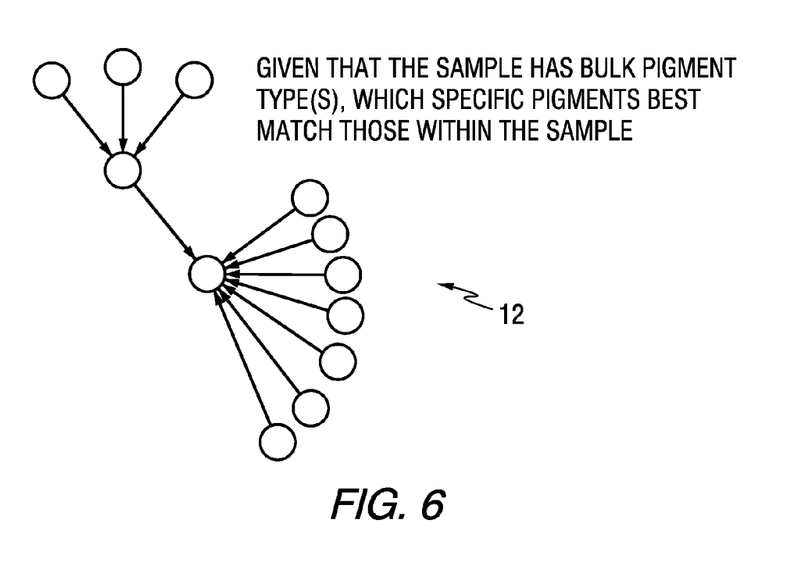
FIG. 6 illustrates a high level representation of a refined pigment identification Bayesian module according to various embodiments of the present invention.

Once a belief has been determined for a bulk pigment by the module 10, that information can then be used as is or be further propagated into a variety of Bayesian systems to perform refined pigment identification by the module 12. A refined pigment identification Bayesian system can be used to determine specific pigments or offsets thereof that comprise a given target coating. The pigment identification module 12 may be broadened to determine a subset of most likely pigments utilized in the target coating to feed that information to the formulation engine 16. In various embodiments the bulk pigment(s) determined from the first tier 10 of the analysis may be used as "starting" decision points for the next tier of the process. The starting decision points may be connected to another set of decision points including, but not limited to the following: re-usage and/or inheritance from any previously used decision points, refined angular analysis based on a specific bulk pigmentation, evaluation of retarded and/or polarized spectral information, analysis of an application of Kepler's Planetary Motion Theorems to spectral data, a unique evaluation of magnetism and solenoids applied to spectral and/or colorimetric data, consideration of a Russian opal or polished metal compared with spectral data, usage of laminar and plug flow theories upon spectral data, or even consideration of efficiency/yield loss equations to further refine the nature of specific pigments in a complex mixture. An example of the refined pigment identification module 12 is shown in FIG. 6. The decision points in the refined pigment identification module 12 may consider characteristics of the target coating versus the known information regarding the pigments of a selected paint system to determine the appropriate available pigments. The output of the refined pigment identification module 12 may be a list of pigments in order of probability of acceptable match to the pigments in the target coating. The list may then be utilized as is for color matching or passed to a formulation engine 16 to produce an acceptable match to the target coating.

The third tier 14 develops a tolerancing solution for the Bayesian system. Depending upon the application, the tolerancing module 14 may be designed to determine adequate stopping points for the formulation engine 16. A correlation between the visual acceptable limits may be calculated in which a variety of Bayesian decision points may be connected together. Examples of the decision points may be, but not limited to, the following: colorimetric values such as L, C, h, Delta E, Similarity Indices of spectral information, 3D and/or 2D models of various key combinations of specular information, a compound match rating system, texture evaluation, or a combined angular normalized spectral "curve." In embodiments, the purpose of the tolerancing tier 14 is to provide a binary answer as to whether a given formulation provides an acceptable formulation or if the formulation engine 16 will require further iterations to provide a single best match for a given target coating.

Figure 7:
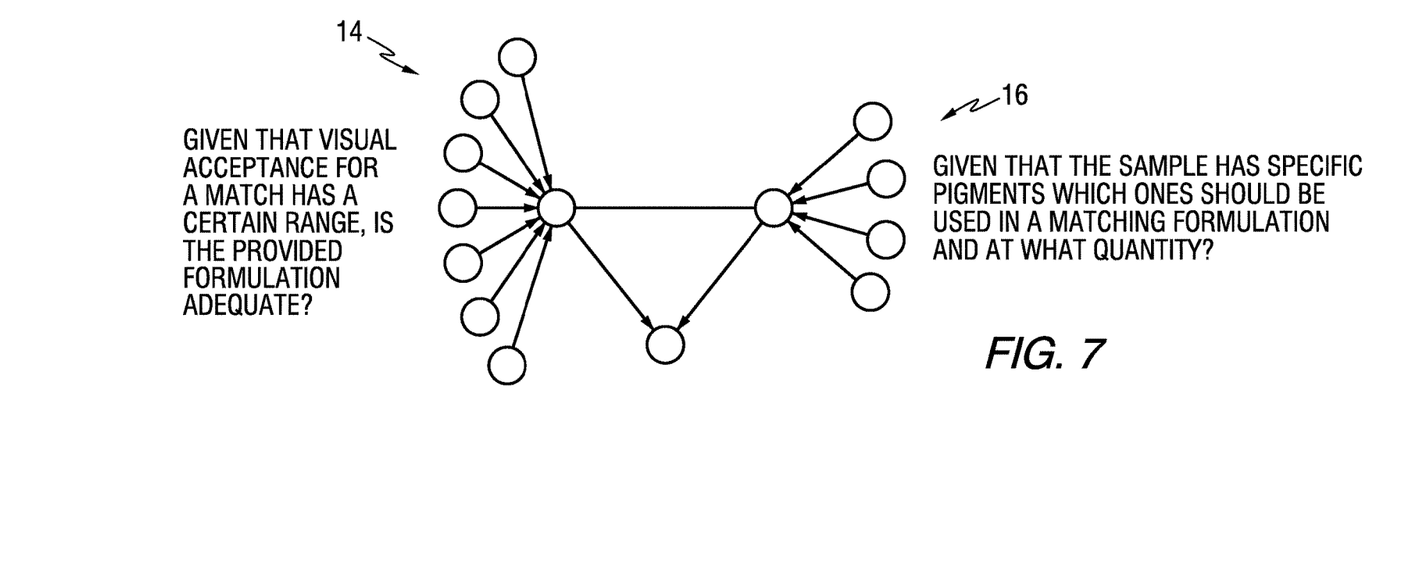
FIG. 7 illustrates a high level representation of a formulation engine, or module, according to various embodiments of the present invention.

The fourth tier 16 is a partial or full Bayesian formulation engine, or module. The engine 16 may be based on radiative transfer equations specifically modified for paint applications. Normal radiative transfer may be utilized on planetary bodies which, although similar to painted surfaces (on a much smaller scale), cannot adequately model complex paint mixtures and interactions without substantial modification. A Bayesian system may be used to formulate the complex mixtures by either feeding the formulation engine a proper base set of pigments and providing tolerancing for an acceptable match quality of a formulation or by acting as a formulation engine itself incorporating different types of formulation techniques. The techniques may include, but not limited to, standard or modified Kubelka-Munk formulation, direct solution methods via derivative based matrices, combinatorial matching, or modified multi-flux theories. These techniques may be iteratively utilized in a Bayesian system referring back to the tolerancing tier 14 to generate a visually acceptable formula matching the target coating. An example of the tolerancing Bayesian module 14 attached to the formulation engine 16 is illustrated in FIG. 7. As described hereinabove, a full Bayesian system may be utilized as the formulation engine 16 itself via a spectral curve matching strategy utilizing a combinatorial approach given a reduced selection of pigments that may be arrived at via bulk and refined pigment identification. Again, the tolerancing tier is utilized to determine an acceptable visual match to the target coating.

Figure 8:
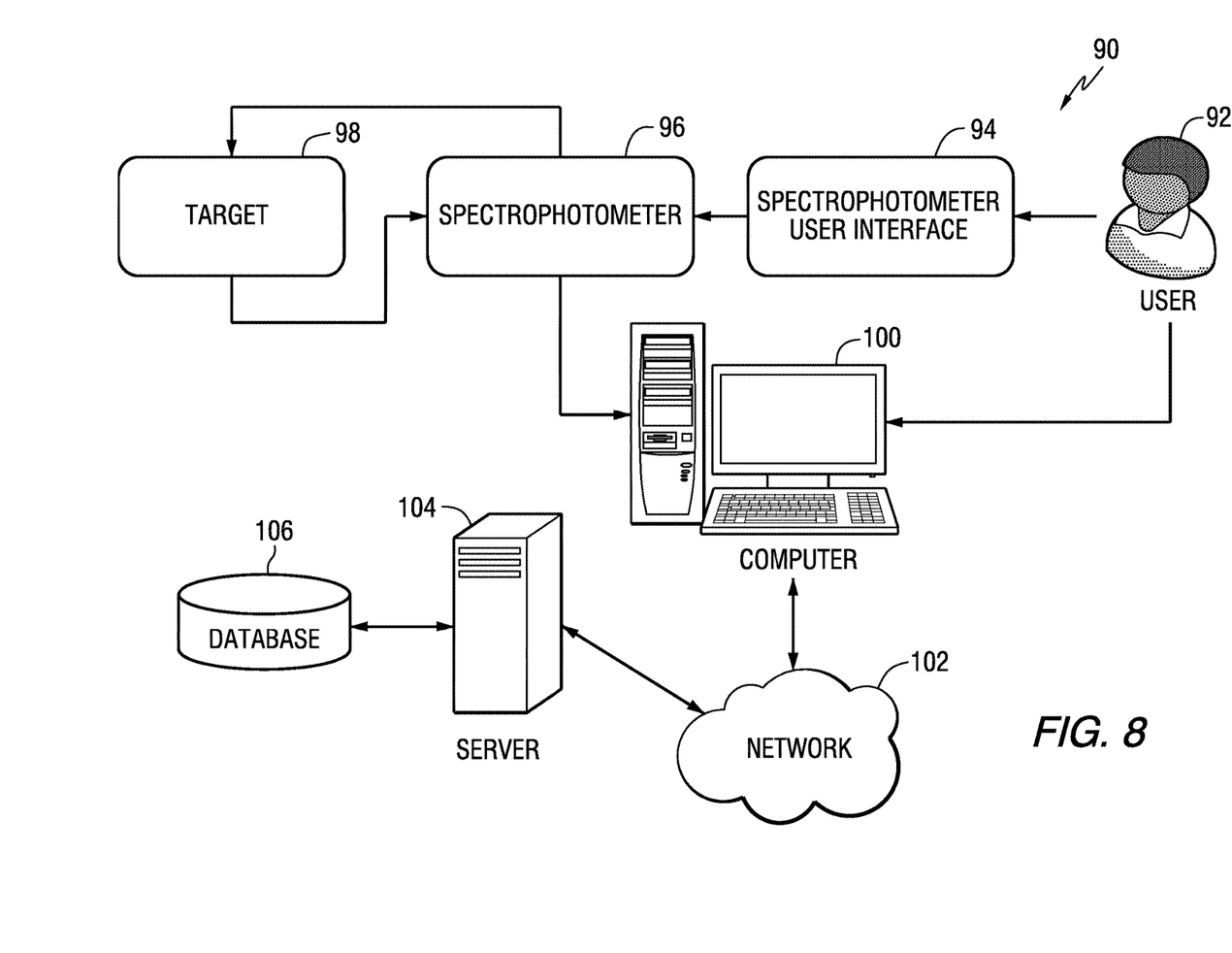
FIG. 8 illustrates an embodiment of a system which may be used to identify physical property attributes of a coating mixture of a target sample.

FIG. 8 illustrates an embodiment of a system 90 which may be used to identify physical property attributes of a coating mixture of a target sample. A user 92 may utilize a user interface 94, such as a graphical user interface, to operate a spectrophotometer 96 to measure the properties of a target sample 98. The data from the spectrophotometer 96 may be transferred to a computer 100, such as a personal computer, a mobile device, or any type of processor. The computer 100 may be in communication, via a network 102, with a server 104. The network 102 may be any type of network, such as the Internet, a local area network, an intranet, or a wireless network. The server 104 is in communication with a database 106 that may store the data and information that is used and generated by the methods of embodiments of the present invention. Various steps of the methods of embodiments of the present invention may be performed by the computer 100 and/or the server 106.

Figure 9:
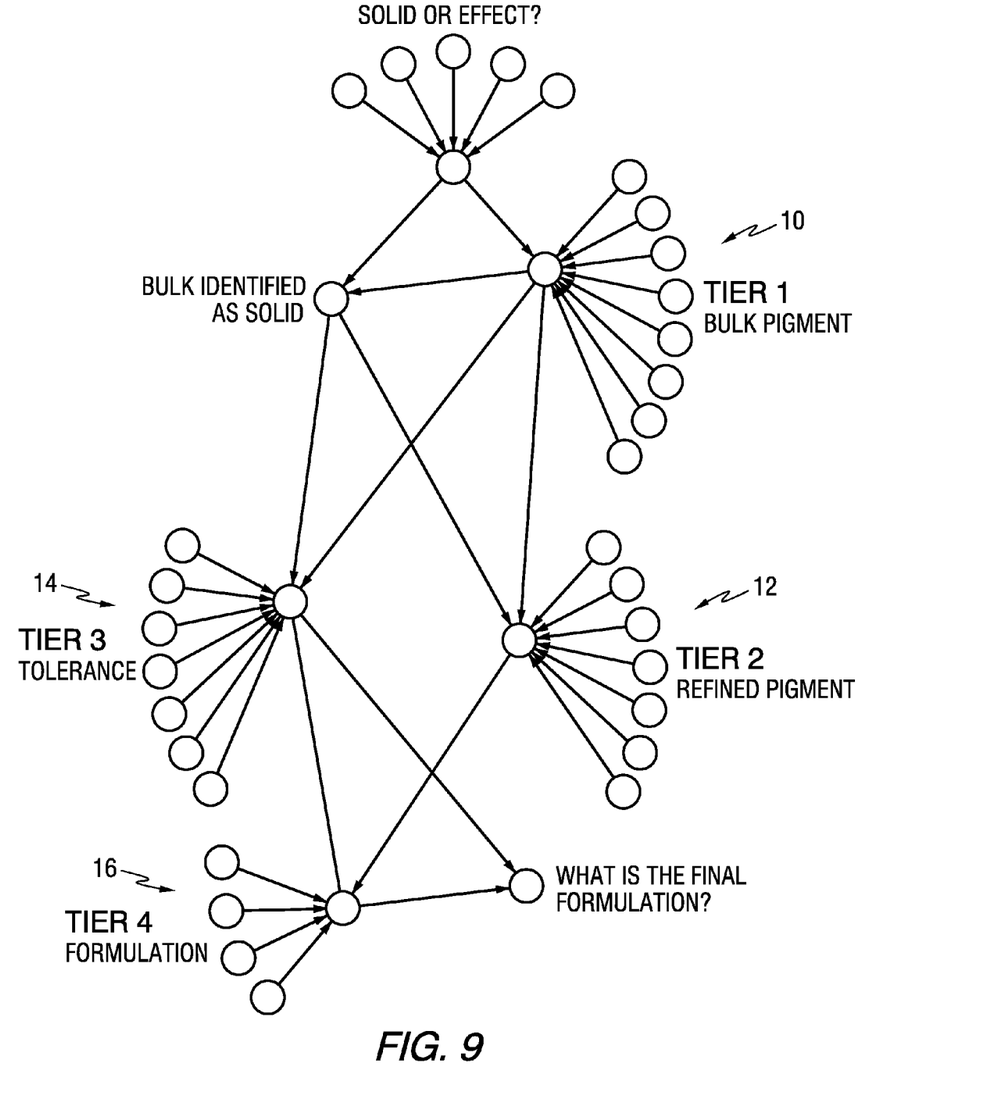
FIG. 9 illustrates a high level representation of a four tier Bayesian system according to various embodiments of the present invention

By combining all four tiers 10, 12, 14 and 16, bulk pigments, a refined pigment list, and a visually matching formulation may be determined for a target coating utilizing a computer, a database, and a spectrophotometer with or without a camera or similar data collection device. The level of sophistication of the Bayesian systems, the spectrophotometer, and the database may determine the quality of the final solution for each tier of the process. Assuming an adequate dataset is used, a more complicated Bayesian system may produce the most accurate formulation if a properly powerful spectrophotometer is utilized. A simplistic Bayesian system utilized with an average spectrophotometer and a limited dataset (e.g., one with a few hardcoded reference points) may produce a less satisfactory formulation. This is also true for each individual tier described herein. Each of the tiers 10, 12, 14 and 16 may be used separately to provide information for other tools or for the user to continue with a manual process. However, at any stage of a manual color matching activity the user may select to re-enter the process and provide appropriate information to continue utilizing the Bayesian Systems. An example of a complete Bayesian system inclusive of the tiers 10, 12, 14 and 16 is presented in FIG. 9.

Figure 10:
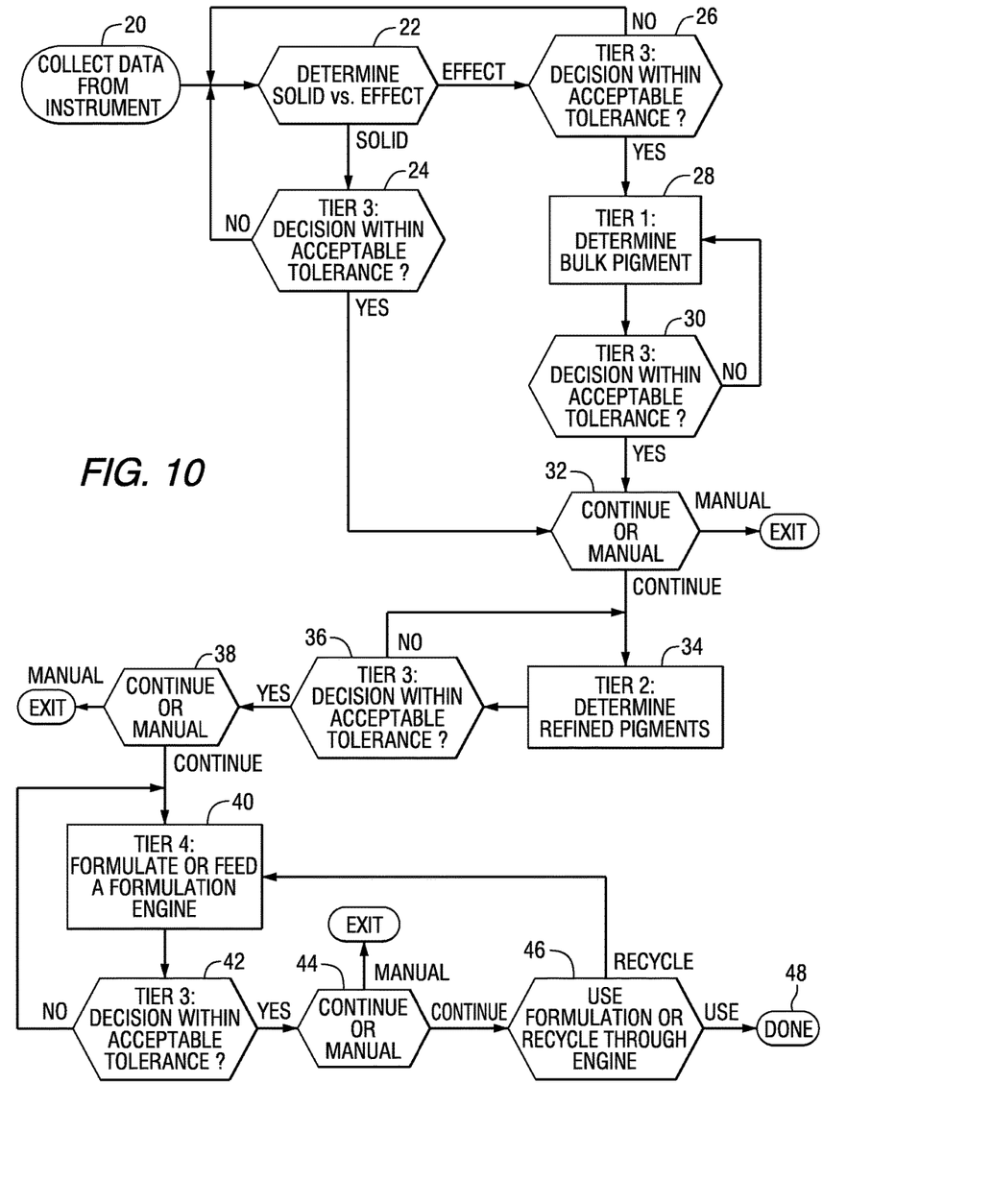
FIG. 10 illustrates an embodiment of a process for identifying physical property attributes of a coating mixture of a target sample.

FIG. 10 illustrates an embodiment of a process for identifying physical property attributes of a coating mixture of a target sample. The process begins at step 20, where data is collected from an instrument (e.g., the spectrophotometer 96). At step 22, the process determines whether a solid or effect is present. If a solid is present, at step 24 the process determines, using the tolerancing module 14, whether the decision at step 22 is within an acceptable tolerance. If not, the process returns to step 22. If an effect is present as determined at step 22, the process advances to step 26, where the process determines, using the tolerancing module 14, whether the decision at step 22 is within an acceptable tolerance. If not, the process returns to step 22.

If the decision at step 22 is within an acceptable tolerance as determined at step 26, the process advances to step 28 where the bulk pigment module 10 identifies the bulk pigment in the target coating. At step 30, the process determines, using the tolerancing module 14, whether the bulk pigment identification is within an acceptable tolerance. If not, the process returns to step 28. If the bulk pigment identification is within an acceptable tolerance, the process advances to step 32 where the user is prompted as to whether the process should continue or whether the user would like to proceed using a manual process. Step 32 is also entered if it was determined that the tolerance is within an acceptable level at step 24.

If the user elects to have the process proceed at step 32, the process advances to step 34 where the refined pigment identification module 12 identifies the refined pigments in the target coating. At step 36, the process determines, using the tolerancing module 14, whether the refined pigment identification is within an acceptable tolerance. If not, the process returns to step 34. If the refined pigment identification is within an acceptable tolerance, the process advances to step 38 where the user is prompted as to whether the process should continue or whether the user would like to proceed using a manual process.

If the user elects to have the process proceed at step 38, the process advances to step 40 where the formulation engine 16 determines the matching formulation of the target coating. In various embodiments, instead of the formulation engine 16 being used to arrive at the formulation, a data match may be made with data stored in, for example, a database using an additional Bayesian system, or module, as a search engine. At step 42, the process determines, using the tolerancing module 14, whether the formulation is within an acceptable tolerance. If not, the process returns to step 40. If the formulation is within an acceptable tolerance, the process advances to step 44 where the user is prompted as to whether the process should continue or whether the user would like to proceed using a manual process.

If the user elects to have the process proceed at step 44, the process advances to step 46 where the user is prompted as to whether the formulation is acceptable or whether another iteration through the formulation engine 16 should be performed. If another iteration is desired, the process returns to step 40. If another iteration is not desired, the process exits at 48 and the formulation is adopted.

Although various embodiments have been described herein as having decision points made inside Bayesian systems, it is contemplated that such decisions may be made outside of a Bayesian system.

In another aspect, the invention may be implemented as a non-transitory computer readable medium containing software for causing a computer or computer system to perform the method described above. The software can include various modules that are used to enable a processor and a user interface to perform the methods described herein.

It will be readily appreciated by those skilled in the art that modifications may be made to the invention without departing from the concepts disclosed in the forgoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A computer implemented method for determining a particular coating formulation, wherein the determination is based on received spectrophotometric data, comprising:
   receiving, from a spectrophotometer without a camera, spectrophotometric data gathered from a target coating;
   calculating one or more first Bayesian decision points from the spectrophotometric data, wherein:
      the one or more first Bayesian decision points generate a first output that comprises a probability that the target coating contains at least one particular aluminum pigment of a plurality of different aluminum pigments, and
      the one or more Bayesian decision points comprise a selection of different probabilistic analysis of spectral information in relation to reference characteristics of each aluminum pigment type within the different aluminum pigments;
   calculating, using the computer processor, one or more second Bayesian decisions points from at least the first output, wherein the one or more second Bayesian decisions points generate a second output that comprises a list of pigments that are each associated with a respective probability of acceptable match to pigments in the target coating;
   formulating, using the computer processor and one or more formulation Bayesian decision points, a formulation of the target coating, based upon the list of pigments calculated in the second output; and
   outputting the formulation of the target coating.

2. The method of claim 1, further comprising determining, using the computer processor, whether the probability that the target coating contains the at least one particular aluminum pigment is within an acceptable tolerance.

3. The method of claim 1, further comprising determining, using the computer processor, whether the respective probability associated with each pigment in the second output is within an acceptable tolerance.

4. The method of claim 1, further comprising determining, using the computer processor, whether the formulation is within an acceptable tolerance.

5. The method of claim 1, wherein formulating the formulation includes using at least one of a Kubelka-Munk process, a direct solution with derivative based matrices, combinatorial matching, and a multi-flux theory.

6. The method of claim 1, wherein one or more of the first Bayesian decisions points comprises analyzing results of specific angular analysis for an aluminum pigment type.

7. The method of claim 1, wherein one or more of the second Bayesian decisions points comprises analyzing usage of a similarity index on spectral data or colorimetric information.

8. The method of claim 1, wherein one or more of the second Bayesian decisions points comprises analyzing three dimensional and two dimensional geometric evaluation of pigment properties, a hybridized electrostatic analysis of pigment properties.

9. The method of claim 1, wherein one or more of the second Bayesian decisions points comprises analyzing a normalized multi-angular set of spectral and colorimetric data.

10. The method of claim 1, wherein one or more of the second Bayesian decisions points comprises analyzing an application of physics trajectories in conjunction with 2D planes created by manipulation of spectral and colorimetric information.

11. A system for providing a coating formulation, comprising:
a database;
a processor in communication with the database and programmed to:
receive, from a spectrophotometer without a camera, spectrophotometric data gathered from a target coating;
calculate, using the computer processor, one or more first Bayesian decision points from the spectrophotometric data, wherein:
the one or more first Bayesian decision points generate a first output that comprises a probability that the target coating contains at least one particular aluminum pigment of a plurality of different aluminum pigments, and
the one or more Bayesian decision points comprise a selection of different probabilistic analysis of spectral information in relation to reference characteristics of each aluminum pigment type within the different aluminum pigments;
calculate, using the computer processor, one or more second Bayesian decisions points from at least the first output, wherein the one or more second Bayesian decisions points generate a second output that comprises a list of pigments that are each associated with a respective probability of acceptable match to pigments in the target coating;
formulate, using the computer processor and one or more formulation Bayesian decision points, a formulation of the target coating, based upon the list of pigments calculated in the second output; and
output the formulation of the target coating.

12. A computer implemented method for determining a coating formulation, comprising:
receiving, from a spectrophotometer without a camera, spectrophotometric data gathered from a target coating;
calculating, using the computer processor, one or more first Bayesian decision points from the spectrophotometric data, wherein:
the one or more first Bayesian decision points generate a first output that comprises a probability that the target coating contains at least one particular aluminum pigment of a plurality of different aluminum pigments,
the one or more Bayesian decision points comprise a selection of different probabilistic analysis of spectral information in relation to reference characteristics of each aluminum pigment type within the different aluminum pigments;
calculating, using the computer processor, one or more second Bayesian decisions points from at least the first output, wherein the one or more second Bayesian decisions points generate a second output that comprises a list of pigments that are each associated with a respective probability of acceptable match to pigments in the target coating;
calculating, using the computer processor, one or more third Bayesian decisions points from at least the second output, wherein the one or more third Bayesian decisions points generate a third output that comprises a binary answer indicating whether a given input is within an acceptable tolerance as determined by the one or more third Bayesian decisions points;
when the third output comprises an affirmative binary answer, formulating, using the computer processor and one or more fourth Bayesian decision points, a formulation of the target coating, based upon the list of pigments calculated in the second output; and
outputting the formulation of the target coating.

13. The method of claim 12, further comprising determining whether probability that the target coating contains the at least one particular aluminum pigment is within an acceptable tolerance.

14. The method of claim 12, further comprising determining whether the respective probability associated with each pigment in the second output is within an acceptable tolerance.

15. A non-transitory computer readable medium including software for causing a computer processor to:
receive, from a spectrophotometer without a camera, spectrophotometric data gathered from a target coating;
calculate, using the computer processor, one or more first Bayesian decision points from the spectrophotometric data, wherein:
the one or more first Bayesian decision points generate a first output that comprises a probability that the target coating contains at least one particular aluminum pigment of a plurality of different aluminum pigments,
the one or more Bayesian decision points comprise a selection of different probabilistic analysis of spectral information in relation to reference characteristics of each aluminum pigment type within the different aluminum pigments;
calculate, using the computer processor, one or more second Bayesian decisions points from at least the first output, wherein the one or more second Bayesian decisions points generate a second output that comprises a list of pigments that are each associated with a respective probability of acceptable match to pigments in the target coating;
formulate, using the computer processor and one or more formulation Bayesian decision points, a formulation of the target coating, based upon the list of pigments calculated in the second output; and
output the formulation of the target coating.

16. The medium of claim 15, further comprising software for causing the computer processor to determine whether the probability that the target coating contains the at least one particular aluminum pigment is within an acceptable tolerance.

17. The medium of claim 15, further comprising software for causing the computer processor to determine whether the respective probability associated with each pigment in the second output is within an acceptable tolerance.

* * * * *